(12) United States Patent
Yang et al.

(10) Patent No.: US 8,752,295 B2
(45) Date of Patent: Jun. 17, 2014

(54) METHOD OF VARYING MATERIAL PROPERTIES

(75) Inventors: Wuhua Yang, Ann Arbor, MI (US); Charles J. Bruggemann, Rochester Hills, MI (US); Robert R. Mayer, Clio, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 508 days.

(21) Appl. No.: 12/980,455

(22) Filed: Dec. 29, 2010

(65) Prior Publication Data

US 2012/0167376 A1 Jul. 5, 2012

(51) Int. Cl.
*B21D 53/88* (2006.01)

(52) U.S. Cl.
USPC ............... 29/897.2; 29/890.038; 29/890.043; 29/890.053; 29/897; 29/897.31

(58) Field of Classification Search
USPC ............ 29/890.038, 890.043, 890.053, 29/890.054, 897, 897.2, 897.31, 897.312
See application file for complete search history.

(56) References Cited

U.S. PATENT DOCUMENTS

| | | | | |
|---|---|---|---|---|
| 3,983,962 A | * | 10/1976 | Torke | 188/377 |
| 4,194,763 A | * | 3/1980 | Reidelbach et al. | 280/784 |
| 5,458,393 A | * | 10/1995 | Benedyk | 296/203.01 |
| 5,492,207 A | * | 2/1996 | Clausen | 188/377 |
| 5,868,456 A | * | 2/1999 | Kowalski et al. | 296/146.6 |
| 5,972,134 A | * | 10/1999 | Buschsieweke et al. | 148/567 |
| 6,477,774 B1 | * | 11/2002 | Marando et al. | 29/897.2 |
| 6,736,448 B2 | * | 5/2004 | Hanakawa et al. | 296/187.09 |
| 6,820,924 B2 | * | 11/2004 | Caliskan et al. | 296/187.03 |
| 6,994,350 B2 | * | 2/2006 | Krajewski et al. | 296/187.03 |
| 7,097,235 B2 | * | 8/2006 | Yasukouchi et al. | 296/187.03 |
| 2003/0075951 A1 | * | 4/2003 | Hanakawa et al. | 296/188 |
| 2005/0029836 A1 | * | 2/2005 | Caliskan et al. | 296/193.06 |
| 2005/0257861 A1 | * | 11/2005 | Raos | 148/592 |
| 2006/0201227 A1 | | 9/2006 | Lepre et al. | |

FOREIGN PATENT DOCUMENTS

| | | |
|---|---|---|
| DE | 10329981 A1 | 2/2005 |
| JP | 7145843 A | 6/1995 |
| JP | 2004108541 A | 4/2004 |

OTHER PUBLICATIONS http://www.swedespeed.com/news/publish/Features/article_720.html.*
http://books.google.com/books?id=86MeAQAAMAAJ&q=laser.*

* cited by examiner

*Primary Examiner* — Carl Arbes
(74) *Attorney, Agent, or Firm* — Quinn Law Group, PLLC

(57) ABSTRACT

A method includes acquiring a first structural component conforming to a design, producing a first vehicle including the first structural component, and transferring possession of the first vehicle with the first structural component having a first set of mechanical properties. The method further includes acquiring a second structural component conforming to the design, subjecting the second structural component to a heat treatment process so that the second structural component is characterized by a second set of mechanical properties different from the first set of mechanical properties, producing a second vehicle including the second structural component, and transferring possession of the second vehicle with the second structural component having the second set of mechanical properties.

12 Claims, 3 Drawing Sheets

METHOD OF VARYING MATERIAL PROPERTIES

TECHNICAL FIELD

This invention relates to varying the mechanical properties of materials.

BACKGROUND

The performance of structural members generally depends upon the material, shape, and size of the structural members. In a vehicle, structural members are configured to meet the particular requirements of the vehicle in which it will be installed, such as bending stiffness, energy absorption, etc. Typically, changing the mechanical properties or characteristics of a structural member involves changing the size, shape, gauge, dimensions, or material of the structural member, which typically involves changes to the tooling used to manufacture the structural member.

SUMMARY

A method includes acquiring a first structural component conforming to a design, producing a first vehicle including the first structural component, and transferring possession of the first vehicle with the first structural component having a first set of mechanical properties. The method further includes acquiring a second structural component conforming to the design, subjecting the second structural component to a heat treatment process so that the second structural component is characterized by a second set of mechanical properties different from the first set of mechanical properties, producing a second vehicle including the second structural component, and transferring possession of the second vehicle with the second structural component having the second set of mechanical properties.

The above features and advantages and other features and advantages of the present invention are readily apparent from the following detailed description of the best modes for carrying out the invention when taken in connection with the accompanying drawings.

DETAILED DESCRIPTION

Figure 1:
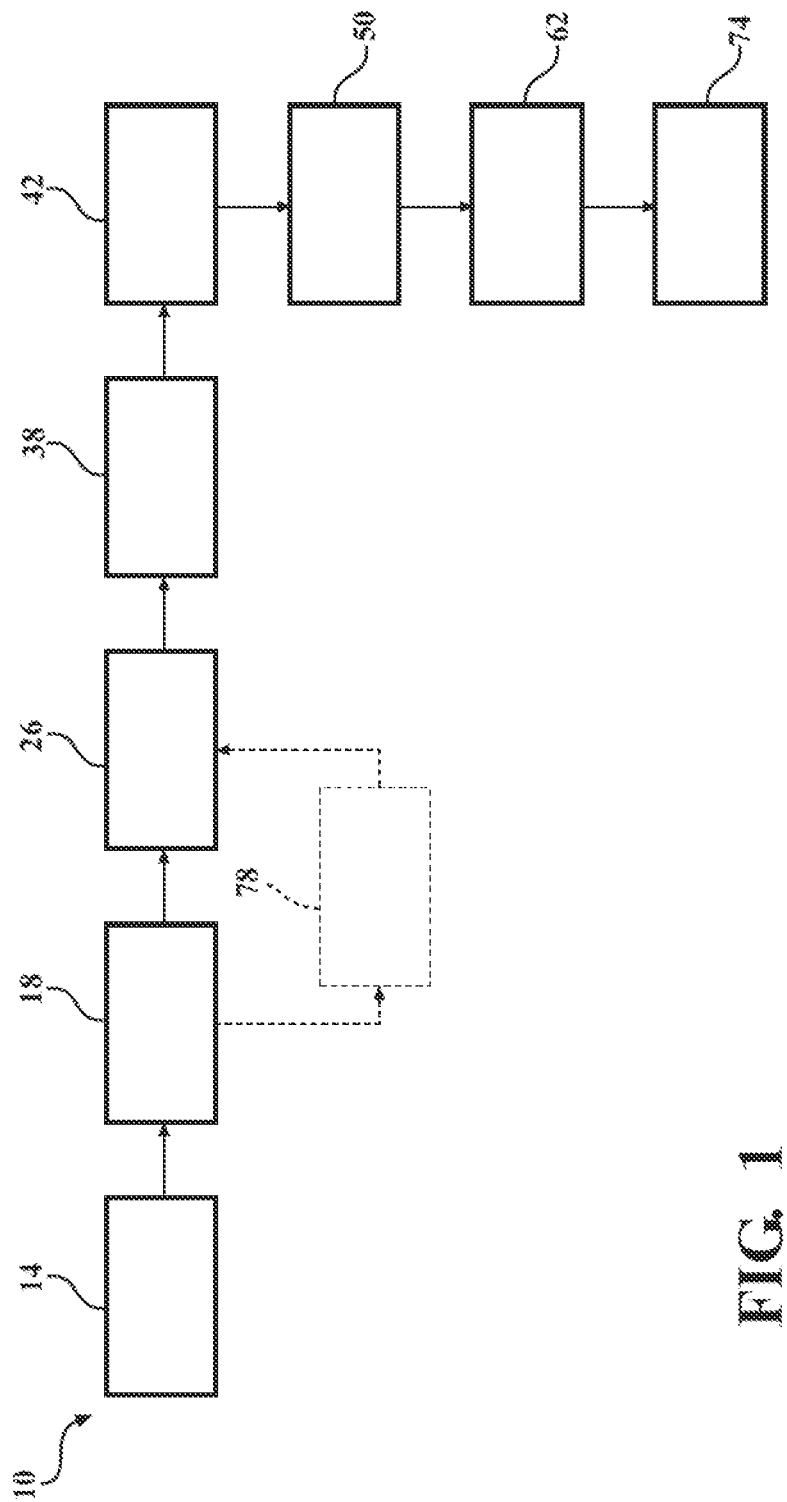
FIG. 1 is a flow chart depicting a method.

Referring to FIG. 1, a method 10 is schematically depicted. The method 10 includes creating a design for a structural component (step 14). Creating the design for the structural component may include determining a size (dimensions), geometric shape, material, tolerancing, etc. for the structural component such that the component is characterized by an original, base set of mechanical properties and meets packaging requirements for the vehicle in which the component will be a part. Mechanical properties include, for example, the deformation response to a compressive axial load, the bending stiffness, etc. In the embodiment depicted, the design specifies that the structural component comprises a metal, such as ultra high strength steel. A structural component may be any component that is configured to bear or transmit a load or absorb energy from a load.

Figure 2:
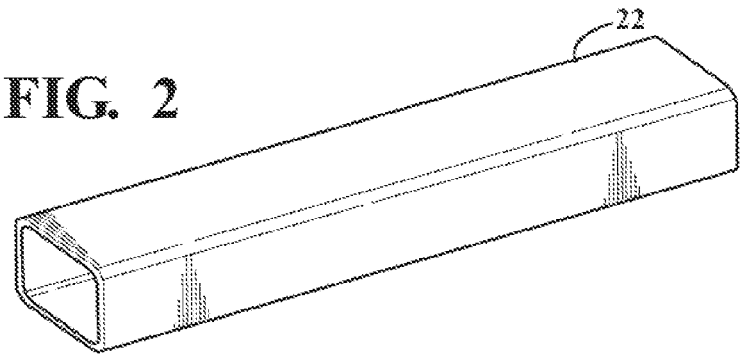
FIG. 2 is a schematic, perspective view of a first structural member.

The method also includes, at step 18, acquiring a first structural component that conforms to the design created at step 14. Acquiring a structural component that conforms to the design may include, for example, purchasing the component or manufacturing the component. A first structural component is shown at 22 in FIG. 2. Referring to FIG. 2, the first structural component 22 depicted is a rail for a vehicle frame; however, other structural components may be employed within the scope of the claimed invention.

Figure 3:
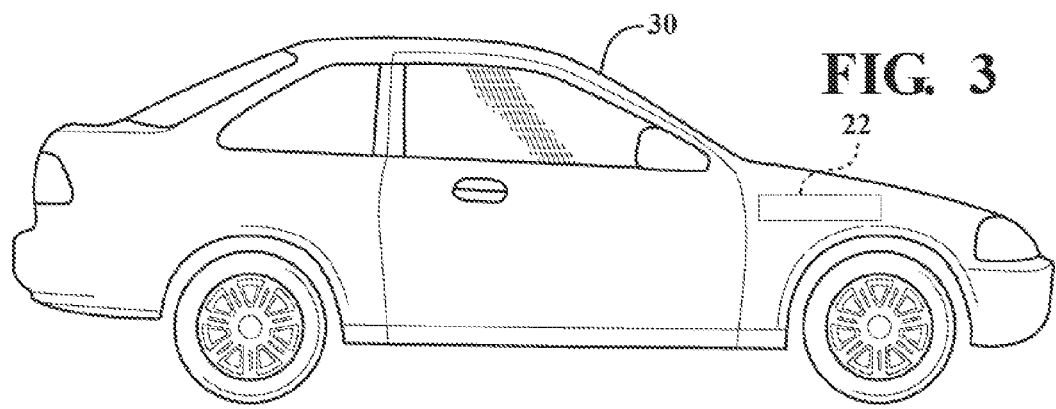
FIG. 3 is a schematic, side view of a first vehicle of which the first structural member is a part.

After acquiring the first structural component at step 18, the method 10 includes producing a first vehicle having the first structural component 22 installed therein (step 26). Referring to FIG. 3, a first vehicle 30 is schematically depicted. The first vehicle 30 includes the first structural component 22 acquired at step 18 as part of the frame of the first vehicle 30, and, more specifically, as a front frame rail. The frame may be separate from the body of the vehicle 30, such as in body-on-frame vehicle architecture. Alternatively, the frame may be integral with the body, as in body-frame integral, or unibody, vehicle architecture. The method 10 also includes, at step 38, transferring possession of the first vehicle 30, such as a sale or lease of the first vehicle 30 to a consumer. The first vehicle 30 at the time of the transfer of possession includes the first component 22 having a first set of mechanical properties. In one embodiment, the first set of mechanical properties is the original, base set of mechanical properties, which the first structural member 22 possessed at step 18.

Figure 4:
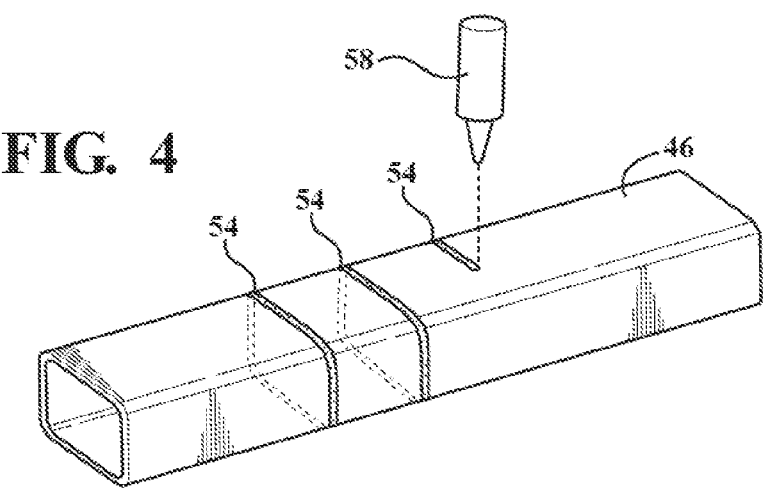
FIG. 4 is a schematic, perspective view of a second structural member that is substantially identical to the first structural member of FIG. 2.

Referring again to FIG. 1, the method 10 further includes, at step 42, acquiring a second structural component that conforms to the design created at step 14. Accordingly, the second structural component is substantially identical to the first structural component, including size, shape, material, etc. Accordingly, the second structural component is initially characterized by the base set of mechanical properties, i.e., the same set of mechanical properties as the first structural member 22 at step 18. A second structural component is shown at 46 in FIG. 4.

The method 10 also includes subjecting the second structural component to a heat treatment process to change the mechanical properties of the second structural component (step 50). More specifically, and with reference to FIG. 4, subjecting the second structural component 46 to a heat treatment process in the embodiment depicted includes locally heating portions 54 of the second structural component 46 to induce a material phase change in the portions 54, while the remainder of the second structural component 46 maintains the original, base material phase. Accordingly, the second structural component 46 is characterized by a second set of mechanical properties (different from the original, base set of mechanical properties) after step 50, while maintaining the same size, shape, etc. For example, the second structural component 46 will respond differently to a bending load after step 50 compared to before step 50. Similarly, the second structural component 46 will respond differently to an axially-applied compressive load after step 50 compared to before step 50. In the embodiment depicted, portions 54 are softer than the original, base material phase, which results in lower yield stress and higher ductility.

Due to thermal diffusion, the final phase variation will be in a sinusoidally modulated pattern. In one embodiment, the localized heat treatment of portions 54 is performed using a laser 58. The portions 54 shown are merely exemplary, and other portions of a structural component may be subjecting to localized heat treatment within the scope of the claimed invention.

Figure 5:
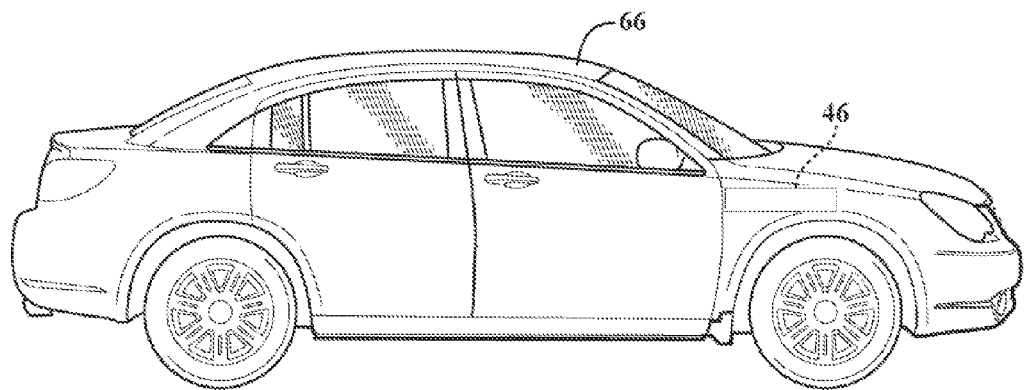
FIG. 5 is a schematic, side view of a second vehicle of which the second structural member is a part.

Referring again to FIG. 1, the method 10 also includes producing a second vehicle having the second structural component 46 installed therein (step 62). Referring to FIG. 5, a second vehicle 66 is schematically depicted. The second vehicle 66 includes the second structural component 46 as part of the frame of the second vehicle 66, and, more specifically, as a front frame rail. The method also includes, at step 74, transferring possession of the second vehicle 66, such as a sale or lease of the second vehicle 66 to a consumer. The second vehicle 66 at the time of the transfer of possession includes the second component 46 having the second set of mechanical properties, i.e., the transfer of possession occurs after step 50.

Thus, the first and second vehicles 30, 66 employ common components 22, 46 having the same design but different mechanical properties. The method 10 enables performance changes to an existing product without requiring new tooling. For example, if, during production of a vehicle model, a change in the mechanical properties is desired, the process performed at step 50 provides subsequently produced vehicles with the newly-desired mechanical properties with no change in the part design, with attendant tooling changes.

Similarly, possession of the first vehicle 30 may be transferred to an entity in a first jurisdiction at step 38, and possession of the second vehicle 66 may be transferred to an entity in a second jurisdiction at step 74. If the second jurisdiction has different performance requirements for vehicles than the first jurisdiction, then the method 10 enables the use of a common component to satisfy the needs of two different markets.

The method 10 also enables common components to be used among different vehicle designs and configurations. For example, the second vehicle 66 may have a different body configuration than the first vehicle 30, the second vehicle 66 may have a different powertrain configuration than the first vehicle 30, etc., which makes the second set of mechanical characteristics desirable in the second vehicle 66.

It should be noted that, in an alternative embodiment, the method 10 includes subjecting the first structural component 22 to a heat treatment process to change the mechanical properties of the first structural component (step 78) such that the first set of mechanical properties (when possession of the first vehicle 30 is transferred at step 38) is different from the base set of mechanical properties and the second set of mechanical properties. It should be noted that, as used herein, the terms "first" and "second" are used merely to differentiate different objects or properties having common terminology, and do not imply chronological order, etc.

Figure 6:
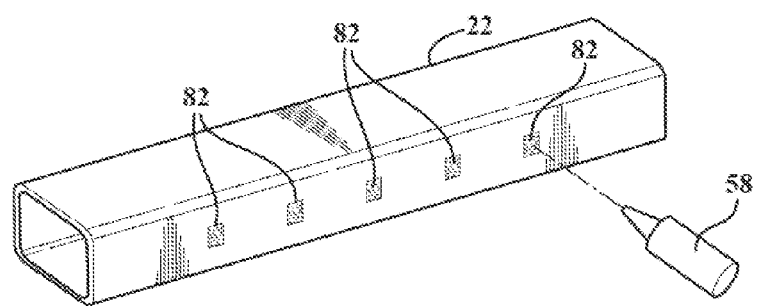
FIG. 6 is a schematic, perspective view of the first structural member of FIG. 2 being subjected to laser heat treating.

For example, and with reference to FIG. 6, step 78 may include locally heating portions 82 of the first structural member 22 with the laser 58 to induce phase changes in the portions 82. Thus, after step 78, portions 82 are softer than the remainder of the first structural member 22, which was not subjected to the heat treatment. Portions 82 are different from the portion 54 of the second structural member 46.

The tubular structural components 22, 46 are exemplary, and sheet metal components may also be used within the scope of the claimed invention. The pattern and location formed by portions 54, 82 may be varied to achieve desired results under specific loads, and can be controlled by the intensity of laser heating, the space distance between the laser paths, and others.

While the best modes for carrying out the invention have been described in detail, those familiar with the art to which this invention relates will recognize various alternative designs and embodiments for practicing the invention within the scope of the appended claims.

The invention claimed is:

1. A method comprising:
   acquiring a first structural component conforming to a design;
   producing a first vehicle including the first structural component;
   transferring possession of the first vehicle with the first structural component having a first set of mechanical properties;
   acquiring a second structural component conforming to the design;
   subjecting the second structural component to a heat treatment process so that the second structural component is characterized by a second set of mechanical properties different from the first set of mechanical properties;
   producing a second vehicle including the second structural component; and
   transferring possession of the second vehicle with the second structural component having the second set of mechanical properties.

2. The method of claim 1, wherein said subjecting the second structural component to a heat treatment process includes locally heating portions of the second structural component.

3. The method of claim 2, wherein said locally heating portions of the second structural component includes laser heating the portions of the second structural component.

4. The method of claim 2, further comprising locally heating portions of the first structural component to provide the first structural component with the first set of mechanical properties.

5. The method of claim 1, further comprising creating the design.

6. The method of claim 1, wherein the first and second structural components comprise high-strength steel.

7. A method comprising:
   acquiring a first vehicle frame rail conforming to a design;
   producing a first vehicle including the first frame rail;
   transferring possession of the first vehicle with the first frame rail having a first set of mechanical properties;
   acquiring a second frame rail conforming to the design;
   subjecting the second frame rail to a heat treatment process so that the second frame rail is characterized by a second set of mechanical properties different from the first set of mechanical properties;
   producing a second vehicle including the second frame rail; and
   transferring possession of the second vehicle with the second frame rail having the second set of mechanical properties.

8. The method of claim 7, wherein said subjecting the second frame rail to a heat treatment process includes locally heating portions of the second frame rail.

9. The method of claim 8, wherein said locally heating portions of the second frame rail includes laser heating the portions of the second frame rail.

10. The method of claim 8, further comprising locally heating portions of the first frame rail to provide the first frame rail with the first set of mechanical properties.

11. The method of claim 7, further comprising creating the design.

12. The method of claim 7, wherein the first and second frame rails comprise high-strength steel.

* * * * *